United States Patent [19]

Legvold et al.

[11] Patent Number: 4,779,189
[45] Date of Patent: Oct. 18, 1988

[54] PERIPHERAL SUBSYSTEM INITIALIZATION METHOD AND APPARATUS

[75] Inventors: Vernon J. Legvold; Stephen O. Wellons, both of Tucson, Ariz.

[73] Assignee: International Business Machines Corporation, Armonk, N.Y.

[21] Appl. No.: 749,898

[22] Filed: Jun. 28, 1985

[51] Int. Cl.⁴ ............................................. G06F 13/00
[52] U.S. Cl. ..................................................... 364/200
[58] Field of Search ... 364/200 MS File, 900 MS File

[56] References Cited

U.S. PATENT DOCUMENTS

| 3,789,365 | 1/1974 | Jen et al. | 364/200 |
|---|---|---|---|
| 4,070,706 | 1/1978 | Scheuneman | 364/200 |
| 4,092,713 | 5/1978 | Scheuneman | 364/200 |
| 4,228,503 | 10/1980 | Waite et al. | 364/200 |
| 4,394,732 | 7/1983 | Swenson | 364/200 |
| 4,394,733 | 7/1983 | Swenson | 364/200 |
| 4,410,942 | 10/1983 | Milligan et al. | 364/200 |
| 4,413,317 | 11/1983 | Swenson | 364/200 |
| 4,415,970 | 11/1983 | Swenson et al. | 364/200 |
| 4,419,725 | 12/1983 | George et al. | 364/200 |
| 4,423,479 | 12/1983 | Hanson et al. | 364/200 |
| 4,425,615 | 1/1984 | Swenson et al. | 364/200 |
| 4,433,374 | 2/1984 | Hanson et al. | 364/200 |
| 4,437,155 | 3/1984 | Sawyer et al. | 364/200 |
| 4,466,059 | 8/1984 | Bastian et al. | 364/200 |
| 4,499,539 | 2/1985 | Vosacek | 364/200 |
| 4,506,323 | 3/1984 | Pusic et al. | 364/200 |
| 4,574,346 | 3/1986 | Hartung | 364/200 |
| 4,638,425 | 1/1987 | Hartung | 364/200 |

FOREIGN PATENT DOCUMENTS 0009412 9/1979 European Pat. Off. .
0009938 9/1979 European Pat. Off. .

Primary Examiner—David Y. Eng
Attorney, Agent, or Firm—H. F. Somermeyer; G. E. Clark

[57] ABSTRACT

Initialization time of a peripheral storage subsystem is reduced. Each subsystem includes a cache store plus a back store having a plurality of DASD storage devides. Storage locations in the cache store are initially allocated for an index table for other subsystem control structures, track buffers, and a limited number of data storing record slots. Limiting the allocation of record slots reduces initialization time. The number of record slots initially allocated is determined by a maximum allowable system initialization time, a total number of subsystem devices to be initialized and the time required to initialize each record slot.

7 Claims, 11 Drawing Sheets

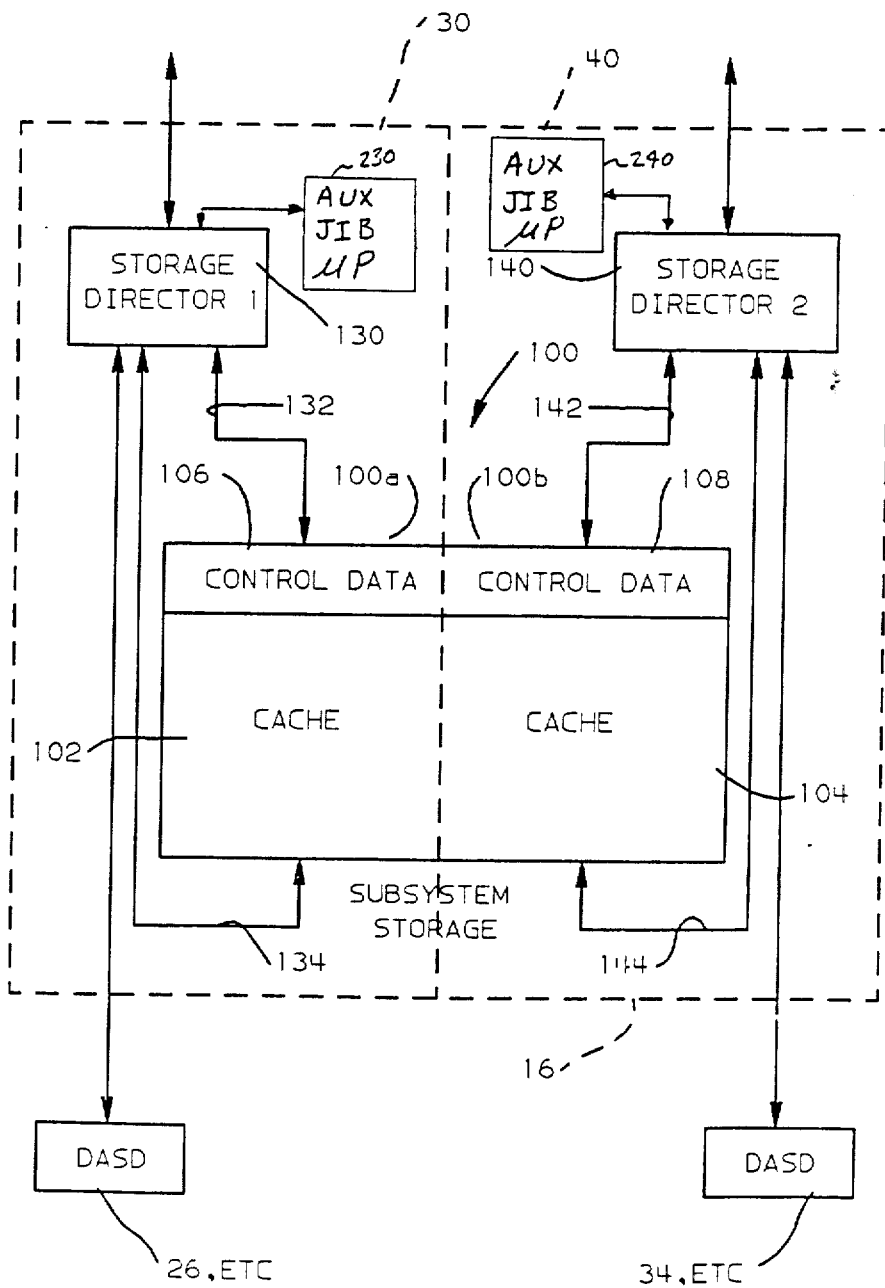

FIG. 3.1
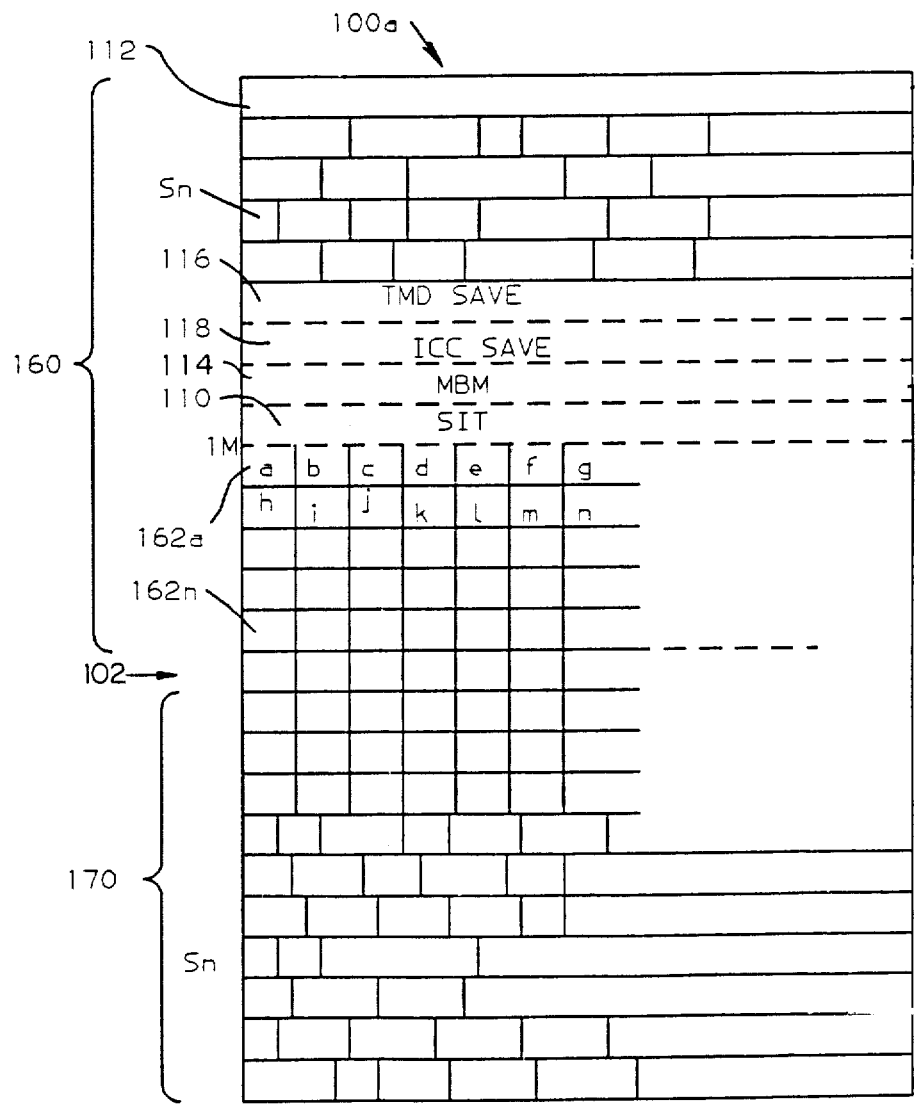
FIG. 3.2
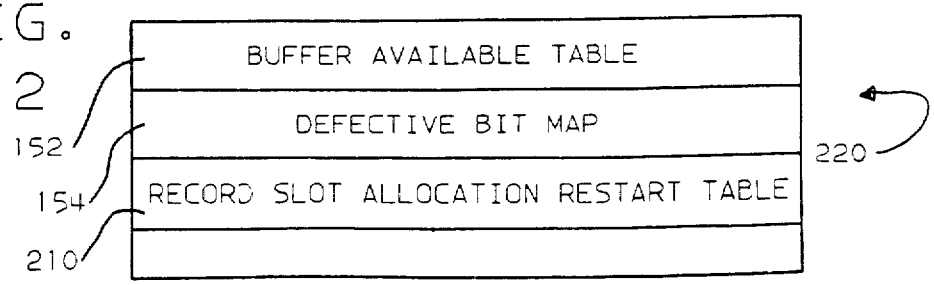

FIG. 4  SIT 110

| HEX | DESCRIPTION |
|---|---|
| 000 | SIT Word 0<br>  Byte 0-1 Directory Entry Offset<br>        Zero Indicates Invalid<br>  Byte 2-3 Directory Entry Offset<br>  Byte 4-5 Directory Entry Offset<br>  Byte 6-7 Directory Entry Offset<br>  Byte 8-9 Directory Entry Offset<br>  Byte A-B Directory Entry Offset<br>  Byte C-D Directory Entry Offset<br>  Byte E-F SRC |
| 001 | Sit Word 1 |
| XXX | Number of additional entries depend of the size of the Subsystem Storage |

FIG. 6

DIRECTORY ENTRY

| HEX | DESCRIPTION |
|---|---|
| 000 | Directory Entry Information<br>  Byte 0      - MRU/Device Number<br>    Bits 0-3  - MRU Counter<br>    Bits 4-7  - Device Number<br>  Byte 1      - Flags<br>    Bit 0    - Entry Valid<br>    Bit 1    - Modified<br>    Bit 2    - Length Equal to Record Size<br>    Bit 3    - Non-Volatile Log<br>    Bits 4-5  - Type of List<br>           00 - MRU/LRU<br>           01 - Defective<br>           10 - Pinned Retryable<br>           11 - Pinned Non-Retryable<br>    Bits 6-7 - Record Slot Size<br>           00 - Record Size 1<br>           01 - Record Size 2<br>           10 - Record Size 3<br>           11 - Record Size 4<br>  Bytes 2-3    - PA (cylinder/head)<br>    Byte 2      - Cylinder Low<br>    Byte 3      - Cylidner High and Head<br>      Bits 0-1  - Zero<br>      Bit 2     - 512 Cylinder High<br>      Bit 3     - 256 Cylinder High<br>      Bit 4-7   - Head Number<br>  Byte 4        - Record Number<br>  Bytes 5-7    - Record Slot Address<br>Directory Entry Pointers<br>  Bytes 8-9    - Address of next older entry in chain<br>  Bytes 10-11  - Address of next newer entry in chain<br>  Bytes 12-13  - Address of next entry in hash chain (entry that hashed to the same SIT entry)<br>  Bytes 14-15  - SRC |
| 001 | 2nd Directory Entry |
| XXX | Number of additional entries depend of the size of the Subsytem Storage |

FIG. 7

MODIFIED BIT MAP 114

| HEX | DESCRIPTION |
|---|---|
| 000 | Bytes 0-1   - Cylinder 0<br>  Bits 0-7   - Heads 0-7<br>  Bits 8-14 - Heads 8-14<br>  Bit 15     - Unused<br>Bytes 2-3   - Cylinder 1<br>  Bits 0-7   - Heads 0-7<br>  Bits 8-14 - Heads 8-14<br>  Bit 15     - Unused<br>Bytes 4-5   - Cylinder 2<br>  Bit 0-7    - Heads 0-7<br>  Bits 8-14 - Heads 8-14<br>  Bit 15     - Unused<br>Bytes 6-7   - Cylinder 3<br>  Bits 0-7   - Heads 0-7<br>  Bits 8-14 - Heads 8-14<br>  Bit 15     - Unused<br>Bytes 8-13  - Unused<br>Bytes 14-15 - SRC |
| 001<br>to<br>0DD | Remainder of MBM Entries for Device 0 |
| 0DE<br>to<br>0FF | Unused |
| 100<br>to<br>FFF | MBM Entries for Devices 1-15 |

FIG. 8

TRACK MODIFIED DATA TABLE 116

| HEX | DESCRIPTION |
|---|---|
| 000 to 007 | TMD Area for Device 0<br>Bytes 0-7    - TMD Information Entry 1<br>Bytes 8-15   - TMD Information Entry 2<br>Bytes 16-23  - TMD Information Entry 3<br>Bytes 24-31  - TMD Information Entry 4<br>Bytes 32-39  - TMD Information Entry 5<br>Bytes 40-47  - TMD Information Entry 6<br>Bytes 48-55  - TMD Information Entry 7<br>Bytes 56-63  - TMD Information Entry 8<br>Bytes 64-71  - TMD Information Entry 9<br>Bytes 72-79  - TMD Information Entry 10<br>Bytes 80-87  - TMD Information Entry 11<br>Bytes 88-95  - TMD Information Entry 12<br>Bytes 96-103 - TMD Information Entry 13<br>Bytes 104-111 - TMD Information Entry 14<br>Bytes 112-119 - TMD Information Entry 15<br>Bytes 120-125 - Pad Bytes<br>Bytes 126-127 - SRC |
| 008 to 00F | TMD Information Entries 16-30 |
| /////////////////////////////////////// |
| 030 to 037 | Bytes 0-79 - TMD Information Entries 91-100<br>Bytes 80-125 - Pad Bytes<br>Bytes 126-127 - SRC |
| 038 to 03F | Unused (Pad to 64 word Boundary) |
| 040 to 3FF | TMD Areas for Devices 1-15 |

FIG. 9  NON-RETENTIVE ICC SAVE AREA 118

| HEX | DESCRIPTION |
|---|---|
| 000 to 007 | Non-retentive ICC Area for Device 0<br>Byte 0          - Search ID Equal ICW<br>Byte 1          - Record Number<br>Bytes 2-3       - Record Length<br>Byte 4          - Set Cache Address ICW<br>Bytes 5-7       - Slot Address<br>Byte 8          - Read or Write ICW<br>Byte 9          - Repeat Count<br>Bytes 10-11     - Directory Address<br>Bytes 12-23     - Non-Retentive ICC Entry<br>Bytes 24-35     - Non-Retentive ICC Entry<br>Bytes 36-47     - Non-Retentive ICC Entry<br>Bytes 48-59     - Non-Retentive ICC Entry<br>Bytes 60-71     - Non-Retentive ICC Entry<br>Bytes 72-83     - Non-Retentive ICC Entry<br>Bytes 84-95     - Non-Retentive ICC Entry<br>Bytes 96-107    - Non-Retentive ICC Entry<br>Bytes 108-119   - Non-Retentive ICC Entry<br>Bytes 120-125   - Pad Bytes<br>Bytes 126-127   - SRC |
| 008 to 00F | Non-Retentive ICC Entries 11-20 |
| // // // // // // // // // // // // |
| 048 to 04F | Non-Retentive ICC Entries 91-100 |
| 050 to 09F | Non-Retentive ICC Area for Device 1 |
| // // // // // // // // // // // // |
| 500 to 54F | Non-Retentive ICC Areas for Device 15 |
| 550 to 5FF | Unused (Pad to 256 Word Boundary) |

FIG. 10

RECORD SLOT HEADER

| HEX | DESCRIPTION |
|---|---|
| 000 | Byte 0 — Sector Number<br>Byte 1 — Zero<br>Bytes 2-3 — Data Length<br>Bytes 4-13 — Undefined<br>Bytes 14-15 — SRC |

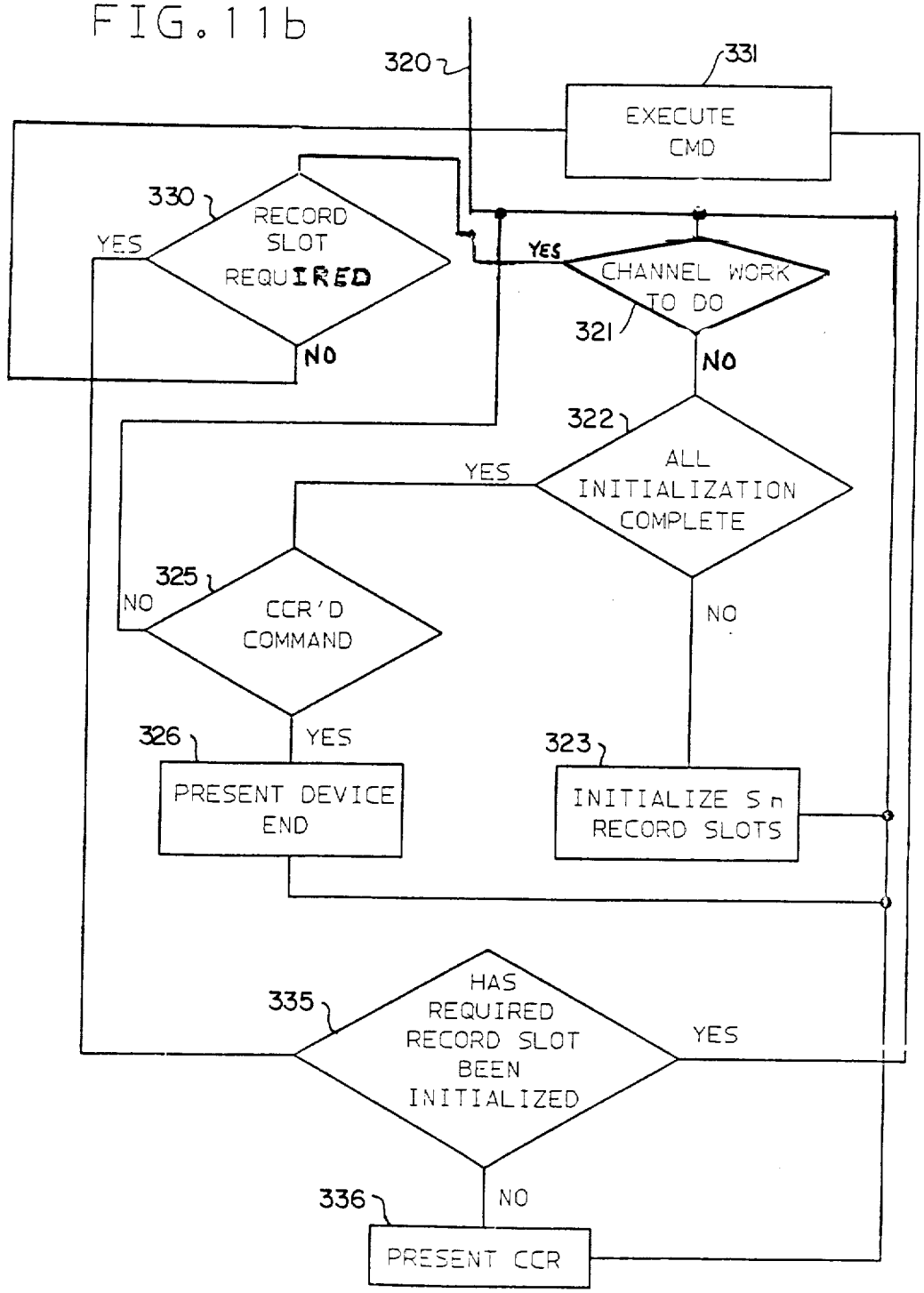

PERIPHERAL SUBSYSTEM INITIALIZATION METHOD AND APPARATUS

DOCUMENTS INCORPORATED BY REFERENCE

IBM System/370 Principles of Operation, IBM Document No. GA22-7000.

IBM System/370 Extended Architecture Principles of Operation, IBM Document No. SA22-7085.

IBM 3880 Storage Control Unit Models 1, 2, 3, and 4 Reference Manual GA26-1661.

IBM 3880 Direct Access Storage Description and User's Guide, IBM Document No. GA26-1664.

IBM 3880 Direct Access Storage Models AD4, BD4, AE4, and BE4 General Information, IBM Document No. GC26-4193.

Transaction Processing Facility Version 2 (TPF-2) General Information Manual, IBM Document No. GH20-6200.

IBM System/360 and System/370 I/O Interface Channel to Control Unit Original Equipment Manufacturer's Information, IBM Document No. GA22-6974-4.

General Information Manual, VM/SP With High Performance Option, IBM Document No. GC19-6221.

Student Manual S/370 and Extended Architecture; Multiple Virtual Storage/Systems Product, IBM Document No. SR23-5740.

U.S. Pat. No. 3,400,371, which describes a host processor and peripheral subsystem employing Input/Output (I/O) channels operated with channel control words (CCW) and using command chaining.

U.S. Pat. No. 4,031,521 for its showing of an idle loop in a programmed processor.

U.S. Pat. No. 4,464,713 shows a subsystem data storage hierarchy including a large backing store and a cache and a method for accessing data from either the cache or backing store.

U.S. Pat. No. 4,466,059 shows a data storage hierarchy having a backing store and a cache buffer store, and a method for determining whether data is to be stored in the cache or backing store or both.

U.S.Pat. No. 4,500,954 shows a data storage hierarchy having a backing store and a cache and means for direct read and write to the backing store bypassing cache or for updating cache.

U.S. Pat. No. 4,429,363 shows a data storage hierarchy having a cache buffer and a backing store including a method for moving data from the backing store to the cache buffer based on cache activity of a previous storage reference.

Copending commonly assigned U.S. application for patent Ser. No. 426,367 filed Sept. 29, 1982.

GLOSSARY OF ACRONYMS

| | |
|---|---|
| AUX JIB | AUXILIARY MICROPROCESSOR TERMED JIB |
| BAT | BUFFER AVAILABLE TABLE |
| CC | CYLINDER ADDRESS IN DASD (TWO BYTES) |
| CCB | CACHE CONTROL BLOCK |
| CCHH | TRACK ADDRESS OF DASD (CYLINDER & HEAD) |
| CCR | CHANNEL COMMAND RETRY SEE GA22-6974-4 |
| CCW | CHANNEL COMMAND WORD SEE GA22-6974-4 |
| CPU | CENTRAL PROCESSING UNIT |
| CU | CONTROL UNIT |
| D | DEVICE OR DASD NUMBER OR ADDRESS |
| D.E. | DIRECTORY ENTRY |
| DASD | DIRECT ACCESS STORAGE DEVICE (DISK UNIT) |
| DBM | DEFECTIVE BIT MAP; SEE FIG. 3.2 |
| HEX | HEXIDECIMAL; A 16-BYTE STORAGE REGISTER |
| HH | HEAD ADDRESS IN DASD (RECORDING SURFACE) |
| I/O | INPUT OUTPUT OF A HOST PROCESSOR |
| IBM | INTERNATIONAL BUSINESS MACHINES CORPORATION |
| ICC | INTERNAL COMMAND CHAIN; SEE USP 4,533,955 |
| ICW | INTERNAL COMMAND WORD; SEE USP 4,533,955 |
| IML | INITIAL MICROPROGRAM LOAD |
| IPL | INITIAL PROGRAM LOAD |
| K | ONE THOUSAND |
| LRU | LEAST RECENTLY USED |
| MBM | MODIFIED BIT MAP; SEE FIG. 7 |
| MRU | MOST RECENTLY USED |
| MVS/SP | MULTIPLE VIRTUAL STORAGE/SYSTEM PRODUCT |
| R | RECORD NUMBER |
| RAS | RELIABILITY, AVAILABILITY & SERVICEABILITY |
| RCV | RECEIVE |
| RDQ | RECORD ACCESS DEVICE DISPATCH QUEUE |
| RPS | ROTATIONAL POSITION SENSING (ON DASD) |
| RWT | RECORDS WRITTEN TABLE (AUX JIB STORE) |
| S/370 | SYSTEM 370 SERIES OF IBM COMPUTERS |
| S1, S2 ... | RECORD SIZES IN CACHE AS SET BY HOST 12 |
| SCP | SYSTEM CONTROL PROGRAM (IN HOST 12) |
| SIT | SCATTER INDEX TABLE (CACHE ACCESSING) |
| TMD | TRACK MODIFIED DATA TABLE 116; SEE FIG. 8 |
| UP | MICROPROCESSOR |
| USP | UNITED STATES PATENT |
| VM/HPO | VIRTUAL MACHINE/HIGH PERFORMANCE OPTION |
| VM/SP | VIRTUAL MACHINE/SYSTEM PRODUCT |

BACKGROUND OF THE INVENTION

1. Field of the Invention

The present invention relates to information handling systems and more particularly to electronic information handling peripheral subsystems having a cache storage and a backing storage and control means for controlling read and write access to records in the cache and in the backing store.

There is a group of users of information handling systems which require a very high number of transactions per second. This group has a clear need for fast access to data, reliable storage of data, efficient Direct Access Storage Devices (DASD), a high message processing rate, balanced activity between DASD actuators, and tailored hardware and software. These installations have average DASD I/O rates ranging from 500 to over 13,500 transactions per second. These users are typically found in the airline, financial, hotel, and data service industries. Their requirements make them sensitive to service times and use of DASD storage.

The present invention is especially adapted to satisfy these users' present and future needs. Using cache technology, it supplies fast and reliable access to data and provides more efficient use of DASD storage.

2. Description of the Prior Art

The following are systems representative of the known prior art.

Peripheral data-storage hierarchies have been used for years for providing an apparent store as suggested by Eden, et al in U.S. Pat. No. 3,569,938. Eden, et al teach that in a demand paging or request system, chaching data in a cache-type high-speed front store (buffer) can make a peripheral storage system appear to have a large capacity, yet provide fast access to data; fast access being faster than that provided by the back store. Eden, et al also teach that the back store can be a retentive store, such as magnetic tape recorders and magnetic disk recorders (direct access storage devices or DASD), while the front store can be a volatile store, such as a magnetic core store. With the advances in data storage technology, the front store typically includes semiconductive-type data storage elements. U.S. Pat. No. 3,839,704 shows another form of such a data storage hierarchy.

An important aspect of data storage hierarchies is enabling data integrity. That is, the data received from the user, such as a central processing unit (CPU) or other data handling device, should be returned to the supplying unit either correct or with an indication that errors may exist. Also, it is typical practice in data storage hierarchies to automatically move data from a higher level to a lower level for retentive storage as well as limiting the data in the higher levels such that other data can be stored for fast access. U.S. Pat. No. 4,020,466 shows copying changes from a high-level store to a backing store, while U.S. Pat. No. 4,077,059 shows forcing copyback under predetermined conditions. Such copyback operations can consume data storage hierarchy time, i.e., so much data may be copied badk that access to the data by a using unit may be degraded. This problem is partially solved by U.S. Pat. No. 3,588,839 which teaches that the only data that need be copied back from a high-level storage unit to a low-level storage unit is that data that is altered, i.e., where there is noncongruence between data in a backing store and data in a front store.

Data storage hierarchies have taken diverse forms. For example, in accordance with the Eden, et al patent 3,569,938 a single high-speed store serviced several users. U.S. Pat. No. 3,735,360 shows that each processor can have its own high-speed store, or cache, for different performance reasons. Performance of the data storage hierarchies also is affected by the algorithms and other controls used to place predetermined data into the cache front store, or high-speed (fast access) storage portion. Accordingly, U.S. Pat. No. 3,898,624 shows that varying the time of fetching data from a backing store to a front, or caching store can be selected by a computer operator in accordance with the programs being executed in a CPU. In this manner, it is hoped that the data resident in the cache, or upper level of the hierarchy, will be that data needed by the CPU while other data not needed is not resident. All of these operations become quite intricate.

Accordingly, evaluation programs have been used to evaluate how best to manage a data storage hierarchy. U.S. Pat. Nos. 3,964,028 and 4,068,304 show performance monitoring of data storage hierarchies for enhancing optimum performance while ensuring data integrity. Much of the work with respect to data storage hierarchies has occurred in the cache and main memory combinations connected to a CPU. The principles and teachings from a cached main memory relate directly to caching and buffering peripheral systems, as originally suggested by Eden, et al, supra. Of course, main memory has been used prior to Eden, et al for buffering or caching data from a magnetic tape and disk unit for a CPU, i.e., a main memory was not only used as a CPU working store but also as a buffer for peripheral devices. To enhance access to data, some data is "pinned" or "bound" to the front store; that is, a copy of such data is guaranteed to be kept in the front store while other data is subject to replacement by new data based upon usage characteristics. Unless such pinned data is copies to a retentive store, a significant data integrity exposure exists.

The performance monitoring referred to above indicates that it is not always in the best interests of total data processing performance and integrity to always use a caching buffer interposed between a using unit and a backing store. For example, U.S. Pat. No. 4,075,686 teaches that a cache can be turned on and off by special instructions for selectively bypassing the cache. Further, the backing store or memory can be segmented into logical devices with some of the logical devices, or segments, being selectively bypassed, such as for serial or sequential input-output operations. This patent further teaches that, for certain commands, it is more desirable to not use cache than to use cache. U.S. Pat. No. 4,268,907 further teaches that for a command specifying the fetching of data words an indicator flag is set to a predetermined state. To prevent replacement of extensive numbers of data instructions already stored in cache during the execution of such instructions, such flag conditions replacement circuits to respond to subsequent predetermined commands to bypass cache storage for subsequently fetched data words. U.S. Pat. No. 4,189,770 shows bypassing a cache for operand data while using cache for instruction data.

In newer designs, the storage capacity of the front store tends to increase. Such increased capacity is often accompanied with faster I/O channel rates, which in turn place increased demands on which data is stored in the front store. Such changes mean that more and more data is stored in the front store. This increased data storage in a volatile front store aggravates a data integrity problem which may be caused by power supply perturbations or outages, for example. Integrity can be ensured by always recording the data in a retentive back store. This requirement tends to degrade performance, i.e., increases data access times. Selective retentive journalling of data as suggested by C. E. Hoff, et al in IBM TECHNICAL DISCLOSURE BULLETIN article "Selective Journalling", June 1975, Vol. 18 No. 1, pages 61-2, reduces performance degradation but does not control the data integrity exposure in a completely satisfactory manner. In a similar vein, Campbell, et al in the IMB TECHNICAL DISCLOSURE BULLETIN, Vol. 18 No. 10, March 1976, pages 3307-9 show multiple replacement classes in a replacement control for limiting interlevel transfers in a multi-level hierarchy. Such techniques still leave a large data integrity exposure or provide limited performance.

A peripheral data storage system's operation-completion indication to a host processor is usually a DEVICE END signal; the DEVICE END indicates that the data received from the host is retentively stored in the data storage system.

U.S. Pat. No. 4,410,942 shows a tape data recorder system including a volatile data buffer having plural modes of operation. In a preferred mode, termed "tape buffer mode", the above-described DEVICE END signal is supplied to the host processor when the data is stored in the volatile buffer but not yet stored in the retentive-storing tape recorder. The data is stored in a tape recorder after the DEVICE END signal. A separate SYNCHRONIZE command from the host to the data storage system requires that all data stored in the volatile buffer be then stored in the tape recorder. In other modes of operation of the volatile buffer, the DEVICE END signal is only sent to the host after the data is stored in the retentive tape recorder. The data storage system also honors a command READ DATA BUFFER which transfers data stored in the buffer (whether sent to the buffer by the host or by a tape recorder) to the host. When data is sent by a host to the data storage system, such data is always intended to be and will be recorded in a retentive tape recorder, as indicated above. The READ DATA BUFFER involves an error recovery technique; usually there is no way of retrieving the data in buffer that was received from the host for a write-to-tape operation.

A possible solution to the data integrity exposure is to provide a retentive front store, such as used in the IBM 3850 Mass Storage System. There DASDs are the cache, or front store, while magnetic tape is a back store. A simplified showing of this type of data storage hierarchy is found in the article by Blickenstaff, et al "Multilevel Store Directory Integrity", IBM TECHNICAL DISCLOSURE BULLETIN, Vol. 20 No. 3, August 1977, pages 939-940. Unfortunately, such retentive buffer usually does not provide the performance (short data access times) sometimes demanded by present-day computers. Accordingly, for a truly high-performance data storage hierarchy, some means must be found to use a large volatile front store while controlling the attendant data integrity exposures. This exposure control also applies to other systems such as printing, communications, and the like.

IBM TECHNICAL DISCLOSURE BULLETIN, Vol. 21 No. 1, June 1978, page 280 describes a mechanism for reducing cache deadlock probability on a store-end-cache multiprocessor having hardware control check pointing without incurring degradation.

IBM TECHNICAL DISCLOSURE BULLETIN, Vol. 18 No. 8, January 1976, page 2643 describes a method for selectively copying portions of a data base normally stored in a memory subsystem portion of a data processing system.

IBM TECHNICAL DISCLOSURE BULLETIN, Vol. 20 No. 5, October 1977, page 1955 describes a check point copy operation for a two-stage data storage facility.

SUMMARY OF THE INVENTION

Therefore, it is an object of the present invention to initialize a peripheral subsystem having a cache and a backing store by apparatus and methods including initializing control structures, tables and save areas in cache, and initializing a limited number of record slots in cache on a first pass to limit the initialization time for each subsystem in a large information handling system.

It is a further object of the present invention to reduce time for subsystem initialization as above stated and further including initializing a restart table which stores information regarding allocation of record slots to establish starting point for each group of record slots to be allocated subsequent to subsystem initialization.

Accordingly, a method and apparatus for reducing initialization time in a peripheral storage system including a large number of subsystems, each including a cache store and a back store having a plurality of DASDs, includes means for receiving an initialization command from a host system; means for generating a first signal indicating a host command was accepted; first means for allocating data storage locations in the cache store for an index table; second means for allocating additional data storage locations in the cache store for subsystem control structures; third means for allocating other data storage locations in the cache store for multiple record buffers; fourth means for allocating a predetermined number of record storing slots in the cache store, said number of record slots determined by a maximum allowable system initialization time, a total number of subsystem devices (DASD) to be initialized and a time required to initialize each record slot; and means for generating a second signal indicating that a limited initialization has been completed.

The foregoing and other objects, features and advantages of the invention will be apparent from the more particular description of the preferred embodiments of the invention, as illustrated in the accompanying drawing.

BRIEF DESCRIPTION OF THE DRAWING

FIG. 2 is a block diagram of a peripheral subsystem embodying the method and apparatus according to the present invention.

FIG. 3.1 is a map of cache storage organized in accordance with the present invention.

FIG. 3.2 is a map of control storage organized in accordance with the present invention and showing the record slot allocation restart table.

FIG. 4 is a map of a scatter index table used with the preferred embodiment of the present invention.

FIG. 6 is a diagram of the format of a directory entry in accordance with the present invention.

FIG. 7 is a diagram of a Modified Bit Map in accordance with the present invention.

FIG. 8 is a diagram of a Track Modified Data Table in accordance with the present invention.

FIG. 9 is a diagram of the Internal Command Chain Save area structure in accordance with the present invention.

FIG. 10 is a diagram of the format of a record slot header in accordance with the present invention.

FIG. 11 which includes FIGS. 11a and 11b is a flow diagram of the initialization method as embodied in a preferred embodiment of the present invention.

In the drawing, like elements are designated with similar reference numbers, and identical elements in different specific embodiments are designated by identical reference numbers.

DESCRIPTION OF THE PREFERRED EMBODIMENTS

Figure 1:
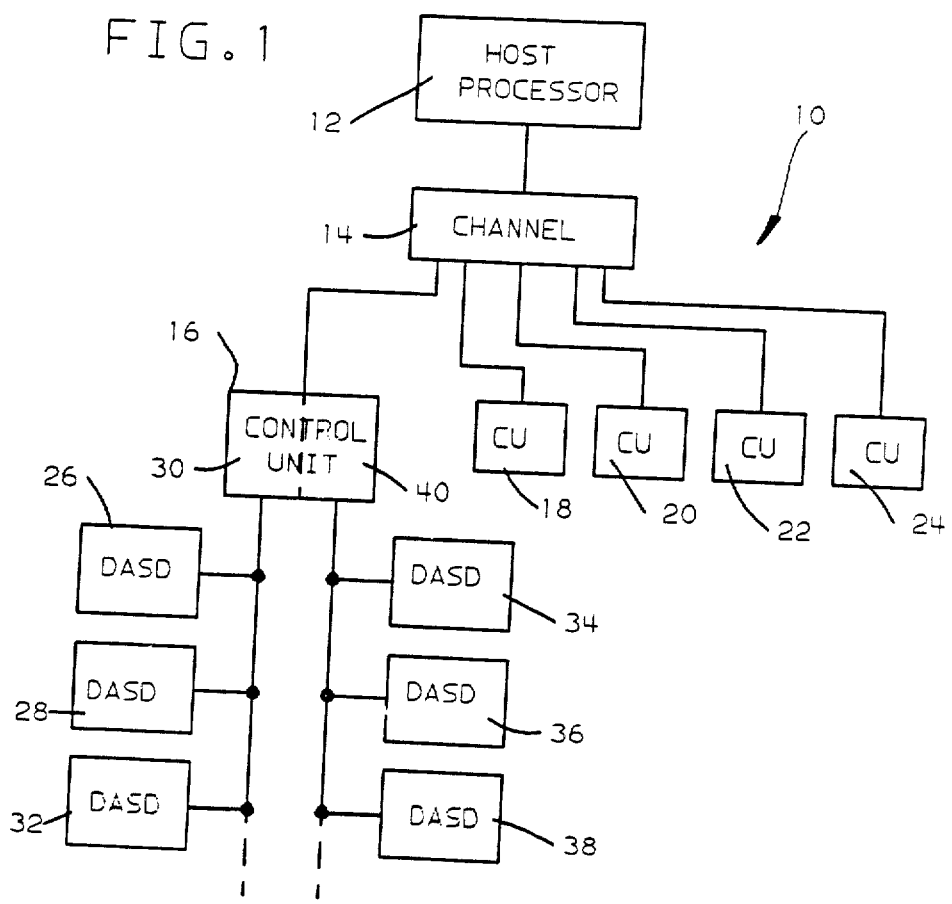
FIG. 1 is a block diagram of an information handling system embodying the present invention.

Referring now to FIG. 1, an information handling system in which the present invention is embodied will be described.

Information handling system 10 includes a host processor 12 which may be one or more processing units connected in any uni-processor or multi-processor configuration. The host processor 12 communicates with channel 14, which provides standard interface signals for communications between the host and peripheral subsystems. A plurality of peripheral subsystem control units 16, 18, 20, 22, 24 etc. are connected to channel 14 (see GA26-1661 and GA22-6974, supra). Channel 14 is one of a number of channels connected to host processor 12. Each control unit, such as control unit 16 (see GA26-1661 and GA26-1664, supra, which include showing of two storage detectors 130 in a control unit), has connected thereto a number of peripheral devices such as direct access storage devices (DASD) 26, 28, 32, 34, 36 and 38.

The present invention is directed more specifically to the control of record data transfers between channel 14, control unit 16 and DASDs 26–38. The method and apparatus of the present invention are embodied in control units 16, 18, 20, 22, 24, etc. Each control unit according to the present invention is divided into two or more partitions 30, 40.

Apparatus and method of a preferred embodiment of the present invention will be described in greater detail with respect to FIGS. 2–11.

Referring now to FIG. 2, the structure of control unit 16 will be described in greater detail. Control unit 16 includes two partitions 30 and 40, each having a storage director 130, 140 (each storage director 130 has the configuration shown for the control units described in U.S. Pat. Nos. 4,466,059; 4,500,594 and 4,429,363), and a portion 100a, 100b of a subsystem storage 100. Subsystem storage 100 includes cache partitions 102 and 104 controlled by storage directions 130 and 140, respectively. Control data areas 106 and 108 controlled by storage directors 130 and 140, respectively. Storage director 130 communicates with DASDs 26, 28, 32 . . . and storage director 140 communicates with DASDs 34, 36, 38 . . . (See FIG. 1).

The operation of each storage director 130, 140 is controlled by a microcode control program resident within the storage director 130 in conjunction with commands received through channel 14. From 92% to 98% of the subsystem storage is used for storing data. The remainder of the subsystem storage are the control data areas 106, 108. As best seen in FIG. 3.1 for area 106, each cache data area 102, 104 in the respective partitions 30, 40 is divided into a number of table save areas and directory entry allocation units, as follows: Scatter Index Table (SIT) 110 (SEE FIG. 4), Modified Bit Map (MBM) 114 (See FIG. 7), Track Modified Data (TMD) 116 (see FIG. 8), Non-retentive Internal Command Chain save area 118 (See FIG. 9), and directory entry allocation units 120 (See FIG. 6). These directory entry allocation units provide efficient storage use for the different size data records that will reside in the cache. The allocation unit sizes are preferably established by a host 12 supplied command at initialization of the subsystem.

The subsystem initialization process which prepares or initializes the subsystem storage for record access operation includes locating the defective areas of the subsystem storage, defining control data structures required to support record access operations, allocating critical data in defect free subsystem storage areas, allowing limited processing (e.g. Read Initial Program Load (IPL) before the subsystem storage has been initialized by the host), evenly distributing record slots throughout the subsystem storage to ensure record slots are equally affected by defective storage, and maintaining control information to reinitialize the subsystem storage without having no check the subsystem storage for defective areas. The subsystem storage is prepared in two steps; firstly, the subsystem storage is made available to the subsystem during Initial Microprogram Load (IML) or by command from the host; and secondly, the subsystem storage is initialized by the subsystem responding to a command received from the host 12.

During IML or as the result of a "make-available" command received from the host 12, the partitions 100a,b of subsystem storage 100 are allocated respectively to a storage director 130, 140 and checked for defective areas. The subsystem storage is checked 32K (K=1000) bytes at a time. This checking is accomplished by writing a bit pattern to the cache 102 using the upper ports 132, 144 respectively for partitions 30, 40. The process used to find defective areas of storage is well known and will not be described in detail. A Defective Bit Map (DBM) 154 is maintained in control store 220 (FIG. 3.2) which is an integral part of each storage director 12. Each bit in the DBM represents 32K bytes of the subsystem storage. If a permanent error is detected in a 32K byte section of subsystem storage 100a,b, the corresponding bit in the DBM is set to a defect indicating state.

Two defect-free megabytes of subsystem storage 100a,b (in cache 102, 104) are allocated to become directory area 160. This allocation is required because errors detected accessing critical areas of the subsystem storage indicate potential data integrity problems. If two defect free Megabytes do not exist, the subsystem storage will be marked unavailable. During operation of the subsystem 10, when an error is detected in a critical area of the subsystem storage, the subsystem storage is made unavailable.

A single full track buffer 112 is allocated in each directory area 160 to allow buffered operations to take place when the subsystem storage is available, but not yet completely initialized. The cache is initialized based upon parameters specified by and received from the host. The directory 160 entries are allocated in the second of the two defect-free megabytes of subsystem storage, preferably beginning at a starting address of the second defect-free area.

During subsystem initialization, each directory entry 162n must be written. Other control tables and control information are partially completed for the cache. The initialization process (allocating only smallest record size in a largest size subsystem storage) can make 15 seconds. The Transaction Facility Processing software in a connected host processor 12 (see GH20-6200, supra) that supports record caching initializes each control unit serially. This means it should take 15 minutes to initialize an installation with 60 control units.

To reduce the initialization time, the allocation of record slots Sn are partially completed with the remainder being completed later from the idle loop. When an initialize command is received from the host processor 12, the parameters are verified and CHANNEL END is presented to the connected host processor 12. The Scatter Index Table (SIT) 110 and the control tables 114, 116, 118 are then initialized and the full track buffers 112 in the two control data area partitions 106, 108 are allocated from subsystem storage 100a, 100b.

Before presenting DEVICE END to the connected host processor 12, a restart table 210 is initialized containing information required to dispatch the initialization function from the usual idle loop (not shown also termed idlescan, as in U.S. Pat. No. 4,031,521 in its FIG. 1) to resume the partially completed record slot allocation. (See FIG. 3.2)

After CHANNEL END has been presented to the connected host processor 12 and before DEVICE END is presented for the initialize channel command, record access mode operations are allowed. If a required record slot size is required but is not available, channel command retry (CCR) status is presented to the requesting host processor to allow the subsystem 10 to initialize some record slots 162n.

Each time the initialization microcode is dispatched from the idle loop after CHANNEL END was presented to the host processor 12, a predetermined number of additional record slots 162n and associated directory entries are allocated. When all directory entries and record slots have been allocated, the initialization code resets a dispatch flag (not shown) and presents DEVICE END for each CCW that was presented with CCR status because a required record slot was not then available.

The time taken by control unit 16 before presenting DEVICE END depends on the number of record slots currently allocated. This number is set such that the time to initialize (time until DEVICE END status is reached) will be no longer than 500 milli-seconds.

A Scatter Index Table (SIT) 110 is used to locate records that are maintained in the cache 102. The SIT 110 is allocated at the end of the first of the first identified defect free megabytes of data storage in subsystem storage 100a, 100b. 4096 subsystem storage words will be allocated for the SIT 110 if the subsystem storage assigned to storage director 130 is 16 megabytes or less and 8192 words will be allocated if the subsystem storage assigned to the storage director 130 is more than 16 megabytes. Each SIT 110 word contains seven entries plus an error correction code such as shown in FIG. 4. Each entry in SIT 110 is a pointer to a directory entry 162n in cache 102. The SIT entry represents a physical address of a record and is calculated by the following hashing algorithm:

$$SIT\ offset = ((15*CC) + HH) + ((W/16*D))$$

Where: CC=the hexidecimal representation of the cylinder; HH=the hexidecimal representation of the head; D=Device Number; and W=the total number of SIT words. The entry number in the SIT word is calculated as follows: Entry position=R/7; where R is the Record Number SIT 110 is initialized to indicate that cache 102 is empty of data.

The following described tables and save areas are allocated during subsystem initialization in the area preceding the SIT 110 in the directory area 160.

1. Modified Bit Map (MBM) 114 (FIG. 7)

The MBM contains a bit for each track of each possible DASD and is used to indicate that modified records may exist in the subsystem storage for the indicated track. The MBM is initialized to indicate that no modified data exists in the cache.

2. Track Modified Data (TMD) Table save area 116 (FIG. 8) There is one TMD save area for each DASD and each is used to save information about modified records on a track when processing a buffered read (read multiple records). Multiple save areas are required because buffered read commands can be received for different DASD while those DASD are disconnected waiting for a SEEK/SET SECTOR interrupt to read records from DASD to the cache 102.

Internal Command Chain save areas 118 (FIG. 9) There is one save area for each device and each is used to save command chains to write modified record to the DASD. Multiple save areas are required because internal command chains (ICC) can be built for different devices while the different DASD are respectively disconnected or waiting for a SEEK/SET SECTOR interrupt to write records from cache 102 to DASD.

The full-track buffers 112 are each allocated in the subsystem storage area having addresses preceding the addresses for the control tables and save areas. When the buffers 112 fill cache 102 from the low control table and save area addresses to addresses less the control table and save areas addresses, so that address 0000 in cache 102 is reached before all buffers 112 are allocated, then the buffer 112 allocation resumes with the high half 170 of the cache 102 allocated to the storage director 130 (each storage director 130 has the confiuration shown for the control units described in U.S. Pat. Nos. 4,466,059; 4,500,594 and 4,429,363). A Buffer Available Table (BAT) 152 is built in control store 220 to maintain information used to assign the buffers 112 to CCW's.

The record slots for storing date in cache 102 are then allocated using weighting factors determined by the host processor 12. An example of the allocation and the weighing factors is as follows:

| Record size (bytes) | Weighting Assigned factor |
| --- | --- |
| S1 = 381; | 1 |
| S2 = 1055; | 3 |
| S3 = 4096; | 5 |
| S4 = 0; | 0 |

Figure 5:
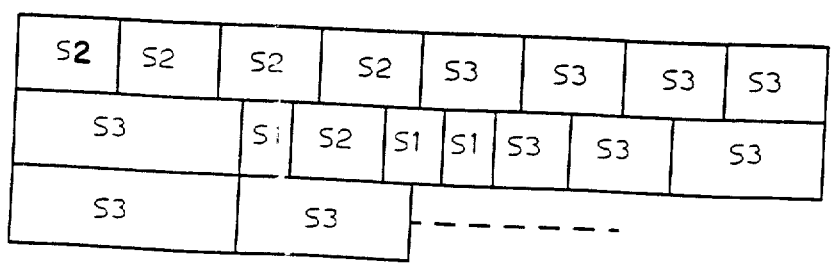
FIG. 5 is a map of record slot allocation in cache in accordance with the present invention.

An allocation of record slots in cache in accordance is with the above-described weighting factors is shown in FIG. 5. The number of slots of the first size S1 specified by the first weight are allocated first. The number of slots in the second size S2 specified by the second weight are then allocated. This process continues for the third S3 and fourth S4 sizes. The process repeats when one allocation pass of all four sizes S1, S2, S3, and S4 has been performed. If the area at the beginning address of cache 102 allocated to storage director 130 was not used for full track buffers 112, the allocation of the record slots continues with the high half 170 of cache 102 allocated to storage director 130 when cache address 0000 assigned to the storage director 130 has been reached. Additional record slots 162n continue to be allocated until the next record allocated would overlay the last directory entry. (See FIG. 3.1) To save time during record slot allocation, record slots are added to a singly linked Free List corresponding to the record size instead of placing each entry in a doubly linking LRU chain by record size. An entry is moved from the Free List to the appropriate LRU chain or list when it is first used for storing data.

The DBM 154 (FIG. 3.2), which was built during make available processing, is used to determine if a better or record slot has been allocated in a defective area of subsystem storage. If the area is defective the buffer or record slot is marked defective and will never be allocated. Since the record slots are distributed evenly throughout the cache, each record slot size receives the same impact when an area of the subsystem storage is defective. During record access operations, if a record slot or buffer is made defective the corresponding bit for the 32K byte section of subsystem storage in DBM 154 is set to a defective area indicating state. Maintaining DBM 154 after initialization allows the host 12 to reinitialize the cache 102 (to change initialization parameters) without requiring that cache 102 be checked for defective areas.

The size of the cache can affect the performance of the subsystem. Obviously, the larger the cache, the more data it can store. Having more data stored in the cache increases the probability of finding the host processor 12 requested data stored in the cache.

OPERATION OF A PREFERRED EMBODIMENT OF THE PRESENT INVENTION

Figure 11A:
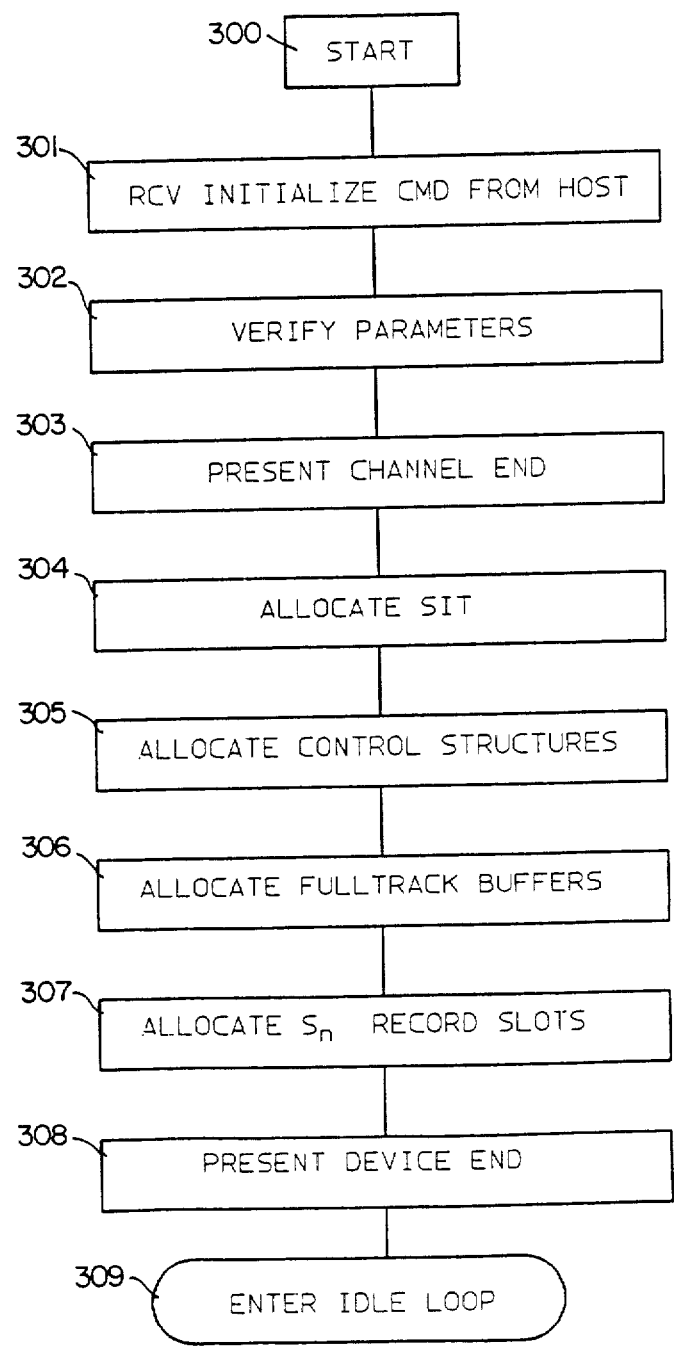

Referring now to FIGS. 11a and 11b, which together comprise FIG. 11, a control flow chart of the initialization process in accordance with the present invention will be described.

At the start 300 of the process, a initialization channel command is received (RCV) at 301 from the host processor 12 through a channel 14. Parameters in the received channel command for the initialization are verified at step 302 and a CHANNEL END signal is presented to host processor 12 at step 303. Space is allocated in step 304 in a control portion of the subsystem storage 100a,b for a scatter index table 110. The scatter index table 110 is initialized to reside in the first defect-free one megabyte area. After the scatter index table 110 has been allocated, at step 305 other control structures, such as a modified bit map table 116, the internal command chain (ICC) save area, and the track modified data save area are allocated.

Next, one or more full track buffers 112 are allocated in step 306 to store a full track of data for buffered operations. Next, in a step 307 a small number of a record slots 162n are allocated, for example Sn=25 to 30. The number of record slots 162n allocated at this point in the process is kept to a minimum number to reduce the total time required to initialize many control units in a large scale data processing system. Next, at step 308 DEVICE END is presented to host processor 12 via channel 14 an an idle loop is entered at step 309 to wait until the control unit 16 is free of channel assigned work received from host processor 12 to proceed with completing subsystem storage intialization of further record slots in cache and associated directory entries.

The idle loop 320 is described in more detail with reference to FIG. 11b. The idle loop 320 always tests first at branch 321 to determine if there is host processor 12 requested work to be done, such as read, write, etc. If there is no host or channel work to be done at a particular time, a test is made at step 322 to see if all initialization of record slots has been completed. If not, 25-30 more record slots are initialized in cache at step 323 and the system then returns to the idle loop to await the next opportunity when there is no host requested or channel work to be done. If all initialization has been complete at step 322, a test is made at step 325 to determine whether a command has been put into channel command tetry (CCR's) status. If not, the process returns to the idle loop 320. If the command has been put in CCR'd status, DEVICE END is presented to host processor 12 via channel 14 at step 326 and the process returns to the idle loop 320.

When channel work is detected at step 321, if the channel requires a record slot at step 330, a test is made at step 335 to determine whether the required record slot has been initialized. If it has not been initialized, channel command retry CCR status is presented to host processor 12 via channel 14 at step 336, and the process returns to the idle loop 320. If the required record slot has been initialized, the command to be performed is executed at step 331.

If a received channel command is waiting to be recorded at step 321 and no record slot is required at step 330, the received command is executed immediately at step 331. By initializing and allocating a small number of record slots on the first pass of the initialization process and then initializing an additional small number of record slots when the system is free of channel work to do so allows the initialization process to be completed without unduly holding up the processing of other work in the data processing system and allowing the complete data processing system to be at least partially initialized during the first pass in a minimum amount of time.

CCR ALGORITHM FOR RECORD ACCESS MODE

The following received channel commands will be CCR'd:

Initialize if the buffer is currently allocated. DEVICE END is presented when the buffer is freed. Buffered read if the stage (move data from DASD to cache) of the requested data to cache fails and the ICC was requeued to retry the stage operation. DEVICE END is presented when the requeued ICC completes. DEACTIVATE by device, DISCARD, and COMMIT commands, if the non-retentive ICC area for that addressed device is in use. DEVICE END is presented when the non-retentive ICC for that device completes. SEEK and Buffered READ/WRITE commands, if there is no track buffer 112 available. DEVICE END will be presented when a buffer 112 becomes available. Cached READ/WRITE commands, if a directory 160 entry is required and there are no directory entries on the free list and the bottom 36 (LRU) entries on the active list for the record size are busy or modified. DEVICE END will be presented when a record slot of the required size changes state (e.g. modified is reset). Cached WRITE commands, if a non-retentive ICC for the device is already built for the same addressed track and the cache copy of the record is currently modified. DEVICE END will be presented when the destage (more modified data from cache to DASD) is complete. The priority for dispatching asynchronous destages is moved ahead of the priority for channel operations until the non-retentive ICC completes. Buffered WRITE commands, if a non-retentive ICC for the addressed DASD is already built for the same track. DEVICE END will be presented when the non-retentive ICC for the device completes. The priority for dispatching asynchronous destages is moved ahead of the priority for channel operations until the non-retentive ICC completes. Format WRITE commands, if modified data may exist for the addressed trackand the non-retentive ICC area for the addressed DASD is in current use. DEVICE END will be presented when the non-retentive ICC for the device completes. The priority for dispatching asynchronous destages is moved ahead of the priority for channel operations until the non-retentive ICC completes.

SCAN FOR LRU MODIFIED DATA TO BE DESTAGED

As cache entries containing modified data reach the bottom (become least recently used) of the LRU lists, the data identified by the cache entry needs to be destaged to a DASD for allowing room for storing more data (replacement). This replacement function is dispatched from the idle loop when its counter (not shown) reaches zero. Each time the idle loop is entered, the idle loop counter (not shown) is decremented by one. The idle-loop counter was set to an "init-value" each time the LRU scan function returns central to the idle loop. The "init-value" is dynamically increased or decreased to tune how often the LRU scan function gets invoked. Whenever subsystem storage is (re)initialized, the "init-value" is reset to 256.

When the LRU scan function is invoked, the LRU lists are scanned by rows to find indications of modified data stored in cache 100. A row consists of the next oldest entry from each LRU list. When a modified track is found an entry is built in a LRU Destage Queue (not shown) if a non-retentive ICC is not already built for the track and the track is not already in the LRU Destage Queue. The scan continues until eight entries have been added to the queue or until 36 entries have been scanned. If the queue contains six entries when the LRU scan function is called by the idle loop, the queue is not rebuilt and control returns back to the idle loop. If the queue containd fewer than six entries when the LRU scan function is called, the entire LRU Destage Queue is rebuilt. If no modified entries are found on any of the LRU lists, the LRU Destage function is being called too often. Then, the "init-value" is incremented by 256. If priority had been given to dispatching synchronous destages and building an ICC for LRU destages, the priority is switched back to channel operations.

If any modified entries are found in an LRU list, the LRU Destage function is being called the right amount. No adjustment is made to the "init-value". Then RDQ 40 (read queue) and LRU Destage Queue to build non-retentive ICC's to destage the tracks containing the modified entries are built.

If when allocating a new directory entry, the new LRU entry is found to identify modified data, the LRU Destage function is not being called often enough. The "init-value" is reset to 256. The idle loop counter is reset, so that idle loop will invoke the function as soon as possible. Priority is given to ICC processing for asynchronous destage and build ICC for LRU destage.

DESTAGE MODIFIED DATA BY TRACK

This algorithm is used to destage LRU identified modified data from the idle loop, when doing a COMMIT (commits non-retentive data to become retentively stored data, see SN 426,367, supra) by extent, a Schedule DASD Update, a format WRITE with modified data on the track, or a DEACTIVATE by device operation.

The SIT 110 is searched to identify all the modified records on one track, i.e. the track currently being processed. All the modified records on the current track will be destaged in one ICC. The necessary control information to construct the ICW's for each record is built in the TMD table 116. The SEEK and SET SECTOR ICW's are constructed in the device's non-retentive ICC area in control store. The TMD is used to access the record slot header to get the sector number for the first record to be destaged. The SEARCH RECORD, CONTROL WRITE DATA, and WRITE DATA ICW's for each record to be destaged are constructed in the addressed DASD assigned non-retentive ICC area in subsystem storage using information from the TMD table. The TMD table 116 is used to determine the length for each record. If the record length is not in the TMD entry for the record, the record slot header is accessed.

When the ICC is to be initiated, the SEEK/SET SECTOR portion of the non-retentive ICC is started. When the DASD interrupt from the SET SECTOR is received by the control unit 16, the cache portion of the non-retentive ICC is copied to the active non-retentive ICC area and chained to the SET SECTOR ICW. After the ICC completes, the directory entry for each record destaged is marked not modified and the bit in the MBM entry for the track is reset. If concurrent operations are active, this cleanup function is queued up to be dispatched from the idle loop.

RECORD ACCESS DEVICE FUNCTIONS DISPATCHED FROM IDLE LOOP (RDQ's)

When scanning in the idle loop, resets and selections are allowed and no noncurrent operations are in progress. There are six Record Access Device Dispatch Queues (RDQ's) used to determine which of six functions are to be dispatched, and to record the order the requests for dispatching were received. If there is an entry in a given RDQ, that function represented by the given RDQ is called from the idle loop. Further checking may be done by the called function to ensure all conditions are met before actually starting the called operation. If all conditions are not met, that function returns to the idle loop, and the algorithm described below is performed by the storage director. The following description defines the six functions for record access mode and the priority order in which they are normally dispatched from the idle loop.

1. Redispatch Synchronous Function RDQ

This function is dispatched from the idle loop after an ICC has completed for the function and the function has additional work to do before DEVICE END is to be presented, (e.g., as for COMMIT record operations) to host processor 12.

2. Dispatch ICC Processing for Channel Operation RDQ

This function initiates ICC's for channel operations. If the addressed device was busy, the next entry on the Channel Operation RDQ is checked. If all requested devices are busy, this function returns to idle loop. This function is dispatched for the following three types of operations: A stage operation is initiated for a single or buffered READ operation. A stage operation consists of transferring data from the addressed device (DASD) to the cache while the subsystem is disconnected from host processor 12 during the LOCATE RECORD or SEEK channel and before the data is passed on to the channel 14 for host processor 12. The end of chain (see U.S. Pat. No. 4,533,955, supra) processing for the ICC is always done when the ICC completes, since any directory maintenance is done after the READ command(s) are processed. A writeback operation performed for a COMMIT record, buffered WRITE, or retentive WRITE channel commanded subsystem operation. A writeback operation consists of transferring data from the cache 100 to the addressed DASD while the subsystem is disconnected from channel 14 and host processor 12, after the data has been received from channel 14. In the case of the COMMIT record operation, the data was written to cache 100 during a previous channel related operation. Destage of modified records as performed for a COMMIT by extent, DEACTIVATE by device, or format WRITE operation. A destage of modified records operation consists of transferring data stored in the cache to the addressed device while the subsystem is disconnected from channel 14, a track at a time. (See "Destage Modified Data by Track" algorithm, supra.) The data was written to cache during a previous channel 14 related operation(s). The addressed DASD non-retentive ICC area is marked reserved during this destage operation. To prevent other subsystem operations from using this addressed DASDs non-retentive ICC area until the channel command supplied by host processor 12 is completed by subsystem 10.

3. Dispatch ICC Processing for Asynchronous Destage RDQ

This function initiates ICC's or start cleanup processing that was not done right away because concurrent operations were in progress. This function is dispatched for non-retentive ICC's built to destage modified data for LRU or Schedule DASD Update operations. If the addressed DASD is busy, the next entry on the Asynchronous Destage RDQ is checked. If all DASDs listed in this RDQ are busy, this function returns to idle loop.

4. Build ICC for LRU destage RDQ

This function builds an ICC to destage modified records whose LRU identifications are located logically adjacent the least recent usage end (bottom) of the LRU list. (See "Scan for LRU Modified Data to be Destaged" algorithm). If the non-retentive ICC area for the addressed DASD is in use, the next entry on the Build ICC for LRU Destage RDQ is checked. If all the required areas execute items listed in this RDQ are currently in use, this function returns to idle loop.

5. Build ICC for Schedule DASD Update RDQ

This function will build an ICC to destage modified records for a Schedule DASD Update operation. If the non-retentive ICC area for the device is in use, the next entry on the Build ICC for Schedule DASD Update RDQ is checked. If all required areas are currently in use, this function returns to idle loop.

6. Dispatch Directory Functions RDQ

The directory functions include invalidating directory entries caused by a received DISCARD by device channel command, invalidating directory entries due to a received DEACTIVATE by device channel command, and moving pinned-retryable entry indications in the LRU list to the top of LRU list (to be most recently used for MRU) due to a pack change interrupt from a DASD.

A list within the directory 160 is maintained for each DASD that indicates which function is to be dispatched with respect to each DASD. If all of the entries are zero, there was no work to do for the indicated DASD and the DASDA's entry in the Dispatch Directory Function RDQ is removed. The priorities for dispatching from the idle loop asynchronous destages and building an ICC for LRU destage may be moved ahead of the priority for channel operations temporarily in two situations;

firstly, when directory 160 entries identifying modified records stored in cache get to the bottom of an LRU list. In this case, priority for both the asynchronous destages and building an ICC for LRU destage is moved ahead of the priority for executing channel opertions, and secondly, when waiting for the on-retentive ICC area because of a CCR'd WRITE operation. In this case, only priority for asynchronous destages is moved ahead of the priority for executing channel operations.

CONCURRENT OPERATIONS

During data transfers, if there is status to present or to allow selections, between DASD and cache, a Device "mini-scan" will be entered to raise REQUEST-INS in order to initiate concurrent processing. During data transfers, in order to initiate concurrent processing between the channel 14 and cache 100, a channel mini-scan will be entered to look for DASD supplied interrupts or drectory operations.

A semi-synchronous operation is defined as data being transferred from an addressed DASD to a full track buffer 112; then when at least one record has been stored in a buffer 112, the stored data may be then transferred to channel 14 for host processor 12. Records may continue to be read from the addressed DASD into the track buffer 112 while previously read records are being simultaneously transferred to channel 14. There is at least one record stored in buffer 112 to be transferred to the channel at all times.

Semi-synchronous operations may be performed for SEEK or buffered READ operations. Before initiating a semisynchronous operation, the modified bit map 114 is checked to see if any modified records may exist in cache for the indicated track. If so, the TMD information area 116 is built during execution of the SEEK or LOCATE RECORD channel command and kept in subsystem storage. The full TMD is reconstructed in control store 220 during the first executed READ channel command, and used to determine whether the data stored in buffer 112 or the data in the record slot Sn is to be transferred to the channel for each subsequent READ command.

An auxiliary microprocessor 230, 240 (AUX JIB) saves the record number R of the first record and compares it with the record number of subsequent records, to ensure that no more than one track will be read into the buffer 112 during the chain of commands including said READ commands. The AUX JIB 230, 240 also checks the record lengths to determine if the lengths match the length given in the immediately preceding DEFINE EXTENT channel command for the addressed DASD.

When the SET SECTOR interrupt is received from the addressed DASD, the DEVICE END for the SEEK or LOCATE RECORD channel command is posted for presentation to host processor 12 via channel 14. If the channel 14 reconnects to host processor 12 before all the records are staged into buffer 112 from the addressed DASD, the operation continues as a semi-synchronous operation. If other channels (not shown) are selected during mini-scan, this operation may finish without becoming semi-synchronous.

The cache 100 is divided equally between the two storage directors 130, 140. Storage director 130 works with the low half of cache and storage director 140 works with the high half. Each storage director figures out its cache assignment by examining the "SD Indicator" bits in its CSTAT4 common register (common to both storage directors and not shown). The size of the cache is determined by the "Storage Size Switches" (not shown) manually set by the installer into a GSSCIN general register (not shown). The following items pertain to each storage director and its half of the cache, without consideration to the other storage director nor its half of the cache.

The cache is checked for 32K defective areas when it is first made available for use by a storage director. Two contiguous defect free one megabyte areas are located for the "Directory Area" 160 when the cache is first made available. If two such areas are not found the cache is not made available. The first and last word of the subsystem storage for each storage director is reserved for maintained procedures called RAS. The SIT 110 is allocated at the end of the first defect free megabyte area of the defect free pair of megabyte areas. The Modified Bit-Map 114 is allocated prior to the SIT 110. The non-retentive ICC areas 118 (FIG. 9) for each device are then allocated prior to allocating the Modified Bit-Map 114. The Track Modified Data (TMD) information areas 116 for each DASD are also allocated prior to the non-retentive ICC areas 118. The directory 160 is built starting at the beginning of the second megabyte of the defect free pair of megabyte storage areas in subsystem storage 100.

The buffers 112 are then allocated, starting from the beginning or top of the first TMD table (FIG. 8) and working back towards the start or lowest address of the cache. The first allocated buffer 112 will always be allocated in the first megabyte area of the defect free pair of megabytes. The generated buffer allocation information is maintained in a table in control store of the storage director 130, 140.

The record slots Sn are then allocated, starting at the subsystem where the last buffers 112 allocated address. When the beginning or lowest address of the cache 102, 104 is reached, allocation continues by wrapping the allocation to the bottom or highest address of the cache and allocating to decreasing addresses towards the directory 160 highest address. The record slots are doled out according to the record size ratios defined in the PERFORM SUBSYSTEM FUNCTION (PSF) initialize channel command, i.e., so many of the first size S1, followed by so many of the next size S2, etc., then repeating this sequence until the directory highest address is reached by an allocation. As each record slot Sn is allocated, its corresponding directory 160 entry is allocated and initialized. Hence, the directory grows in the cache 102, 104 towards the allocated record slots Sn as the record slots are allocated at decreasing addresses towards the directory highest address. All buffers 112 and record slots Sn that fall in a defective 32K area will be marked defective. All non-defective record slots will be placed on the Free list for its record size.

There are separate directory LRU lists for each of the record sizes specified in the PSF command. Directory entries are allocated to records from the free list and made MRU on the active list when the ensuing data transfer completes. When there are no free directory entries, the first LRU entry that is not modified and not busy is allocated for the record to be cached. If "inhibit cache loading" is indicated and the requested record is not stored in cache 100, the directory entry is put back on the list instead of being made MRU.

When processing a DISCARD channel command or DEACTIVATE by device channel command, the directory 160 is physically scanned to invalidate all entries for the addressed DASD. A physical scan of the directory examines each entry sequentially, starting with the first directory entry and progressing towards the end of the directory. This scan ensures that all entries for the addressed DASD are found, since other operations may alter the order of the various has chains and directory lists. Existing entries are set busy, and new entries are allocated and set busy, while the subsystem is connected to the channel. The busy indicator for an entry is kept in the CCB. Only one entry can be busy for a DASD at a given time. Directory entires are made MRU concurrent with the data transfer, if possible. Otherwise, they will be made MRU after DEVICE END has been presented to host 12 during end-of-chain processing.

The Scatter Index Table (SIT) 110 (FIG. 3.1) consists of SIT words. Each SIT word contains seven SIT entries. Each SIT entry is two data storage bytes and, if the entry is valid, contains the address of a directory entry. An address of 0000 indicates end of chain of SIT entries.

To hash (access by hashing) to an SIT entry, the storage director 130 multiplies the cylinder address CC by the number of heads (15) per cylinder, then it adds the head address (HH) to the product to create a first sum. Then a device offset (the device offset is the device number times 1/16 of the total number of SIT words is added to the first sum to create a second sum. The second sum is divided by the number of SIT words and the remainder is the offset to the SIT word from the beginning (lowest address) of the SIT. Divide the record number by seven and add it to the remainder to get the SIT entry address.

The channel command set includes CCWs which permit the attached host 12 to pass information to subsystem 10 about the nature of the current channel program and indication of future uses of the blocks of data referenced by the channel program. The subsystem 10 may use these usage attributes to alter its internal algorithms; for example, use of the buffer submode attribute for the DEFINE EXTENT command indicates that this reference should result in a buffered data access rather than a cached data access.

Thus, while the invention has been described with reference to preferred embodiments thereof, it will be understood by those skilled in the art that various changes in form and details may be made without departing from the scope of the invention.

What is claimed is:

1. In a data storage hierarchy having a front store and a back store each of which have a multiplicity of addressable data storage locations with diverse ones of the addressable data storage locations being further divided into addressable record locations of diverse sizes; programmable processor means connected to said front and back stores and data transfer means connected to said programmable processor means and to said front and back stores for effecting data transfers between the stores in response to commands received from the programmable processor means;

the improvement including the combination of:

control storage means operatively connected to the programmable processor means for storing and supplying programming indicia signals to the programmable processor means, for receiving and storing control signals supplied by the programmable processor means and for returning such received and stored processor supplied control signals to said programmable processor means;

initialization programming indicia in said control storage means for enabling said programmable processor means to initialize said front store with predetermined control indica for enabling the programmable processor to operate the data storage hierarchy, said initialization programming indicia including an indication of a maximal permitted initialization time and said programmable processor means responding to said initialization programming indicia to allocate a plurality of data storing locations for storing data as can be initialized during said indicated maximal permitted initialization time after said predetermined control indicia have stored in said control storage means;

sad initialization programming indicia further including indica for enabling sid programmable processor means to store record slot allocation indicia in said control storage means for indicating the number of currently allocated record slots and a maximum number of record slots that can be allocated, initialization and programming indicia in said initialization programming indicia for enabling the programmable processor means to stop initialization processing when said limited number of record slots have been allocated and ensue with data storage operations of the data storage hierarchy, said limited number being less than said maximum number; and completion programming indicia in said control storage means for enabling the programmable processor means to sense said stored indications of maximum number of record slots and the currently allocated record slots for allocating additional record slots after said initialization completion and during operation of the data storage hierarchy for storing and retrieving data in and from said front and back stores, respectively.

2. Apparatus for limiting initialization time in a peripheral storage system including a front store and a back store having a plurality of storage devices, comprising in each subsystem:

means for receiving host commands to be executed in the storage system including an initialization command from a host system;

means for accepting and generating a first signal indicating that host command has been accepted;

first means connected to said receiving means for responding to said received initialization command for initially allocating locations in said front store for an index table; second means connected to said receiving means for responding to said received initialization command for initially allocating additional locations in said front store for subsystem control structures including an indication of a slot table having a number of currently allocated record slots; third means connected to said receiving means for responding to said received initialization command for initially allocating locations in said front store for track buffers; fourth means connected to said receiving means for responding to said received initialization command for initially allocating a predetermined number of record slots in said front store; and storing said predetermined number in the slot table;

fifth means for indicating a maximum allowable system initialization time, a maximum number of possible record slots, a total number of subsystem devices to be initialized and a time required to initialize each record slot, said predetermined number being not greater than the quotient of (said maximum initialization time minus the time for initially allocating by said first, second and third means) divided by the time required to allocate one record slot and rounded to a next lower integer; and means for generating a second signal indicating that a limited initialization has been completed and enabling data storage operations with said predetermined number of record slots.

3. Apparatus according to claim 2, further comprising:

idle time means for determining whether there is any received and accepted host command still requiring action by the storage system; completion means for reading said slot table and coupled to said fifth means for receiving said maximum slot number for comparing the currently allocated number with the maximum number to determine whether all record slots in said front store have been allocated;

means in the completion means for indicating that allocation is complete when said two numbers are eual; and means coupled to the fifth means, said completion means and said front for allocating a second predetermined number of additional record slots in said front store if said completion means indicate that allocation is not complete.

4. A method for limiting initialization time in a peripheral storage system including a plurality of subsystems, each system including a front store and a back store having a plurality of addressable data storage devices;

the steps of:

receiving an initialization command from a host system;

firstly allocating locations in said front store for an index table;

secondly allocating additional locations in said front store for subsystem control structures including a slot table;

thirdly allocating locations in said front store for track buffers;

fourthly calculating a predetermined number from a maximum allowable system initialization time T1, the time required by said first through third steps T2, a total number of subsystem devices to be initialized and a time T3 required to initialize each record slot;

fifthly allocating said predetermined number of record slots each requiring a given data storage capacity in said front store, a maximum allowable system initialization time T1, the time required by said first through third steps T2, a total number of subsystem devices to be initialized and a time T3 required to initialize each record slot using the equation $(T1-T2)/T3$ and rounding to the next lower integer, then determining the maximum number of record slots by measuring the data storage capacity of the front store and subtracting the data storage capacity used by said index table, said subsystem control structures and said track buffers to create a free space number, then dividing the free space number by said given data storage capacity to create a maximum slot number, storing said maximum number in said slot table;

upon completion of said first through fifth steps, storing said predetermined number in said slot table as the currently allocated number of allocated record slots; and begin data storing and retrieving operations with said front and back stores using said predetermined number of record slots, said predetermined number being less than said maximum slot number.

5. A method according to claim 4, further comprising the steps of:

receiving commands other than said initialization command from a host system with each command requiring predetermined actions within said system;

sixthly testing whether or not ther is any of said predetermined command actions outstanding in the system;

seventhly reading said slot table to compare the maximum number with the allocated number, if not equal then no slots have been allocated, if equal all slots have been allocated;

generating an allocation complete indicator when the numbers are equal;

when the numbers are not equal, allocating a certain number of record slots in said front store; and continue receiving commands and allocating slots.

6. In a data storage hierarchy having a volatile front store and a retentive backing store each of which have a multiplicity of addressable data storage locations;

data transfer means connected to said front store and to said backing store for transferring data therebetween;

a programmable processor connected to both said stores and to said data transfer means for controlling same;

a control store connected to said programmable processor for storing program indicia and control signals for enabling said programmable processor to control said front and backing stores and said data transfer means;

the improvement including, in combination:

means in said front store for storing indications of allocations and a record restart allocation table for indicating the current state of said allocations to enable allocation restart of said addressable data storage locations;

initialization program indicia in said control store for enabling said programmable processor to allocate a certain number of said addressable data storage locations which number is less than a total number of said data storage locations to be allocated in said front store for storage of data;

certain number control signals stored in said control store for indicating said certain number as being a number of said data storage locations allocatable during a predetermined initialization time; and allocation continuation program indicia stored in said control store for enabling said programmable processor to allocate, during times when no data is being transferred from or to said front store, additional ones of said front store data storage locations for storing data whereby during initialization a predetermined number of said data storage are allocated for enabling data storage operations in said front store while not extending said predetermined initialization time to include allocation of all of said data storage locations.

7. In the data storage hierarchy set forth in claim 6 wherein said continuation program indicia further include indicia enabling said programmable processor to access said restart table upon reinitiating said allocations for reading the last allocated address and upon completion of each portion of the allocation for storing the last allocated address.

* * * * *